United States Patent
Chen et al.

(10) Patent No.: US 9,841,999 B2
(45) Date of Patent: Dec. 12, 2017

(54) APPARATUS AND METHOD FOR ALLOCATING RESOURCES TO THREADS TO PERFORM A SERVICE

(71) Applicant: Futurewei Technologies, Inc., Plano, TX (US)

(72) Inventors: Weizhong Chen, Austin, TX (US); Bin Yang, Shanghai (CN); Tong Sun, Allen, TX (US)

(73) Assignee: Futurewei Technologies, Inc., Plano, TX (US)

( * ) Notice: Subject to any disclaimer, the term of this patent is extended or adjusted under 35 U.S.C. 154(b) by 53 days.

(21) Appl. No.: 14/815,871

(22) Filed: Jul. 31, 2015

(65) Prior Publication Data

US 2017/0031717 A1  Feb. 2, 2017

(51) Int. Cl.
  *G06F 9/46* (2006.01)
  *G06F 9/50* (2006.01)
(52) U.S. Cl.
  CPC .......... *G06F 9/5016* (2013.01); *G06F 9/5094* (2013.01)
(58) Field of Classification Search
  None
  See application file for complete search history.

(56) References Cited

U.S. PATENT DOCUMENTS

| | | | |
|---|---|---|---|
| D580,901 S | 11/2008 | Su et al. | |
| D586,772 S | 2/2009 | Su et al. | |
| 7,889,856 B2 | 2/2011 | Wang et al. | |
| 8,218,668 B2 | 7/2012 | Yang et al. | |
| 8,336,109 B2 | 12/2012 | Zhang et al. | |
| 8,353,055 B2 | 1/2013 | Zhang et al. | |
| 8,391,497 B2 | 3/2013 | Zhang et al. | |
| 8,407,772 B2 | 3/2013 | Yuan et al. | |
| 8,611,912 B2 | 12/2013 | Li et al. | |
| 8,719,956 B2 | 5/2014 | Huang et al. | |
| 8,737,622 B2 | 5/2014 | Zhang et al. | |
| 8,930,433 B2 | 1/2015 | Li et al. | |
| 8,971,451 B2 | 3/2015 | Chen et al. | |
| 9,001,659 B2 | 4/2015 | Sun et al. | |
| 2004/0142717 A1* | 7/2004 | Schmidt | G06F 9/30036 455/550.1 |
| 2005/0223382 A1 | 10/2005 | Lippett | |
| 2006/0153355 A1 | 7/2006 | Wang et al. | |

(Continued)

FOREIGN PATENT DOCUMENTS

| | | |
|---|---|---|
| CN | 101366004 A | 2/2009 |
| CN | 102591722 A | 7/2012 |
| CN | 102708007 A | 10/2012 |

OTHER PUBLICATIONS

Gwennap, L et al., "Soft Machines Targets IPC Bottleneck," New CPU Approach Boosts Performance Using Virtual Cores, Microprocessor Report, The Linley Group, Oct. 27, 2014, pp. 1-5.

(Continued)

*Primary Examiner* — Emerson Puente
*Assistant Examiner* — Steven Do
(74) *Attorney, Agent, or Firm* — Zilka-Kotab, PC

(57) ABSTRACT

An apparatus and method are provided for allocating resources to a plurality of threads to perform a service. In use, a request for service is received. At least one of a plurality of resources is allocated to the threads. Further, the service is performed with the threads, utilizing the allocated at least one resource.

17 Claims, 14 Drawing Sheets

(56) References Cited

U.S. PATENT DOCUMENTS

| | | |
|---|---|---|
| 2007/0150895 A1 | 6/2007 | Kurland |
| 2009/0079547 A1* | 3/2009 | Oksanen ................ G06Q 30/02 340/10.3 |
| 2009/0290656 A1 | 11/2009 | Yang et al. |
| 2012/0015572 A1 | 1/2012 | Behrens |
| 2012/0157109 A1 | 6/2012 | Li et al. |
| 2013/0111604 A1 | 5/2013 | Huang et al. |
| 2013/0282777 A1 | 10/2013 | Guo et al. |
| 2013/0282778 A1 | 10/2013 | Sun et al. |
| 2013/0282783 A1 | 10/2013 | Li et al. |
| 2013/0331954 A1* | 12/2013 | McConnell ......... G06F 15/7842 700/2 |
| 2014/0115142 A1 | 4/2014 | Peng et al. |
| 2014/0136582 A1 | 5/2014 | Chen et al. |
| 2014/0161210 A1 | 6/2014 | Chen et al. |
| 2014/0204746 A1 | 7/2014 | Sun et al. |
| 2014/0328399 A1 | 11/2014 | Yang et al. |
| 2014/0341282 A1 | 11/2014 | Yang et al. |
| 2014/0348037 A1 | 11/2014 | Yang et al. |
| 2016/0274944 A1* | 9/2016 | Winkel ............... G06F 9/30145 |

OTHER PUBLICATIONS

International Search Report and Written Opinion from International Application No. PCT/CN2016/075858, dated Jun. 3, 2016.

\* cited by examiner

APPARATUS AND METHOD FOR ALLOCATING RESOURCES TO THREADS TO PERFORM A SERVICE

FIELD OF THE INVENTION

The present invention relates to digital signal processing, and more particularly to configurable computing.

BACKGROUND

Different computing services have different requirements in terms of bandwidth, latency, data rates, etc. For example, 3G/4G cellular services have different requirements with respect to 5G cellular services, which has diverse use cases. To satisfy such different requirements, system designers often rely on multiple-core digital signal processing (DSP) systems [e.g. system-on-a-chip (SoC), etc.], where each DSP core has multiple threads. Conventional multiple thread DSP cores are typically fixed in the sense that the capabilities of each thread is equal and fixed.

Unfortunately, the fixed nature of such threads limits the system designers' ability to accommodate the different requirements for different services. Just by way of example, if a DSP core is designed to support a high data rate use case, such DSP core would exhibit very low power efficiency when supporting a regular date rate use case.

There is thus a need for addressing these and/or other issues associated with the prior art.

SUMMARY

A baseband processor is provided including a receiver to receive a request for service. Also included is a configuration unit to allocate at least one of a plurality of resources to a plurality of threads, wherein the at least one of the plurality of resources is configurable. A performing unit is also included to perform the service with the threads, utilizing the allocated at least one resource.

Also included is an apparatus including at least one baseband processor. The at least one baseband processor comprises a receiver to receive a request for service, and a configuration unit to allocate at least one of a plurality of resources to a plurality of threads. The at least one of the plurality of resources is configurable. The at least one baseband processor also comprises a performing unit to perform the service with the threads, utilizing the allocated at least one resource.

A method is also provided for allocating resources to a plurality of threads to perform a service. In use, a request for service is received. At least one of a plurality of resources is allocated to the threads. Further, the service is performed with the threads, utilizing the allocated at least one resource.

DETAILED DESCRIPTION

Figure 1:
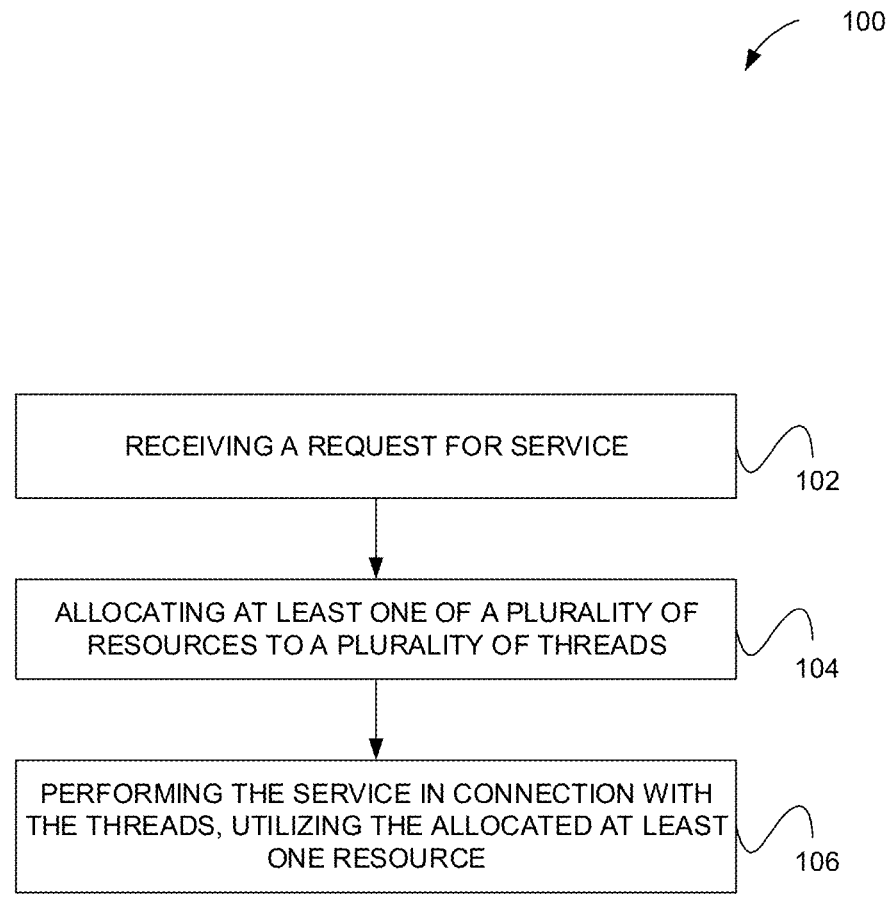
FIG. 1 illustrates a method for allocating resources to threads to perform a service, in accordance with one embodiment.

FIG. 1 illustrates a method 100 for allocating resources to threads to perform a service, in accordance with one embodiment. As shown, a request for service is received, such that the request may be identified for prompting further processing. See operation 102. In the context of the present description, such service includes any operation capable of being carried out, at least in part, by threads, and the request refers to any signal capable of resulting in the service being performed. In one embodiment, a receiver may be provided for receiving the request for service. Various examples of such a receiver will be set forth later during the description of subsequent embodiments.

In one embodiment, the service may be performed utilizing at least one processor. For example, the at least one processor may include a very long instruction word (VLIW) processor. Still yet, in one embodiment, the at least one processor may include a single processor, such as a baseband processor. In other embodiments, the at least one processor may include a first baseband processor and a second baseband processor, or any number of processors (e.g. general purpose processor, hardware accelerator, multiple general purpose processors/hardware accelerators, etc.), for that matter. Even still, in the context of an embodiment involving a baseband system-on-a-chip (SoC), such baseband SoC may include multiple first baseband processors, and multiple second baseband processors.

Further, the service may include a cellular service (e.g. 5G cellular service, etc.). Specifically, as will be described later in the context of different embodiments, the service may include a 5G cellular service that is packaged with other services (e.g. 3G, 4G service, etc.). As will also be set forth later, such bundling may require diverse use cases, each with different resource requirements.

To accommodate this, in operation 104, at least one of a plurality of resources is allocated to threads. In the context of the present description, such resources refer to any resource with which the aforementioned service is capable of being performed. In the context of various embodiments that will be described hereinafter in greater detail, the resources may include scalar functional units and/or vector functional units. Further, in various possible embodiments, such resources may be equipped with different vector widths, clock rates, memory or cache resources (e.g. access ports, etc.), load or store functional units, processor instruction issuing slots, etc. Also in the context of the present description, the aforementioned allocation refers to any act that results in at least one of the plurality of resources being used for performing the service in connection with the threads.

Still yet, a thread refers to a hardware block capable of executing a computer program. In one possible embodiment, a thread may have access to the resources necessary for executing such computer program. In one embodiment, a configuration unit may be provided for such resource allocation, where various examples of such a configuration unit will be set forth later during the description of subsequent embodiments. Still yet, the allocation of resources may involve grouping the resources, according to type.

To this end, the service is performed in connection with the threads, utilizing the allocated at least one resource. See operation 106. For example, in one embodiment, the threads and associated allocated resource(s) may be used to perform the service, in response to the service request. In one embodiment, a performing unit may be provided for performing the service, various examples of which will be set forth later during the description of subsequent embodiments. Still yet, in another embodiment, the service may be performed with multiple computer programs running on multiple threads. In one possible embodiment, a number of the threads may even be configurable.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
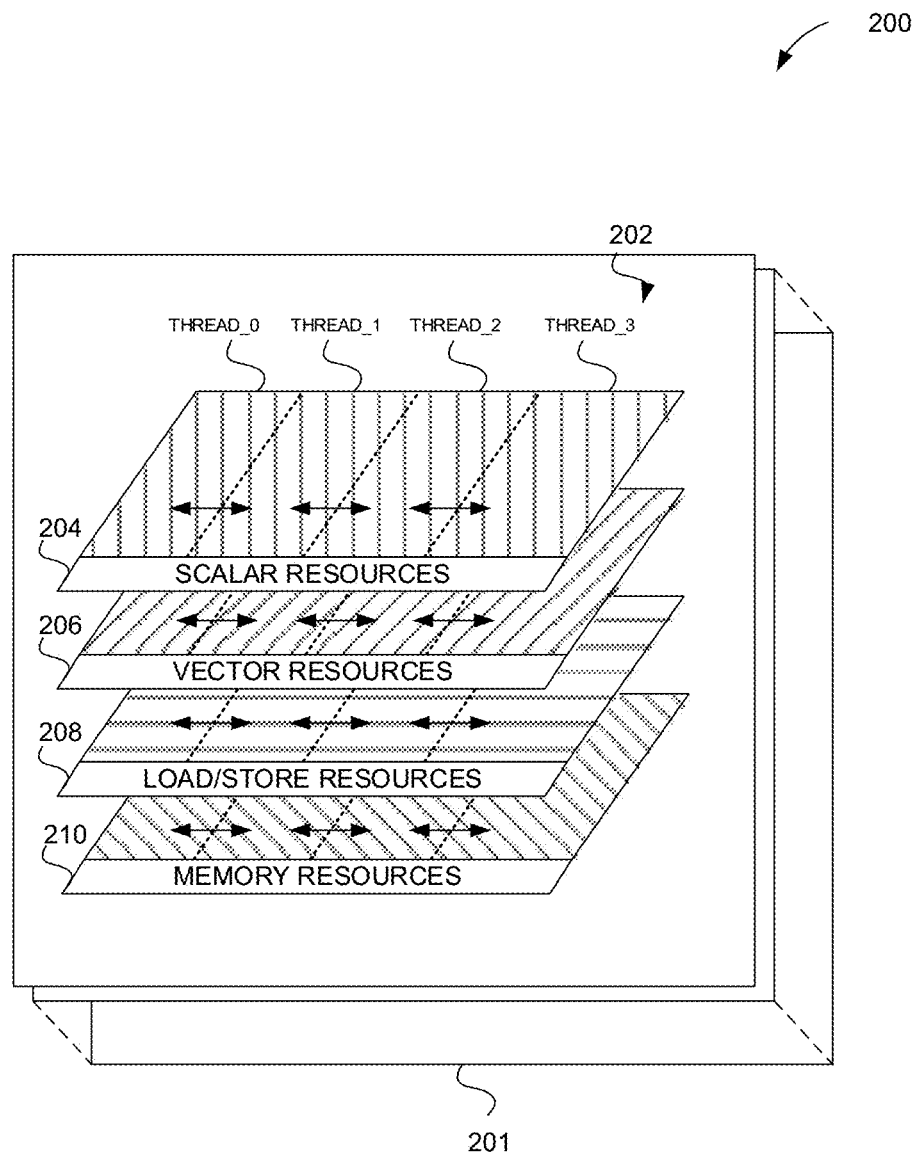
FIG. 2 illustrates a framework with which resources are allocated to a plurality of threads to perform a service, in accordance with one embodiment.

FIG. 2 illustrates a framework 200 with which resources are allocated to a plurality of threads to perform a service, in accordance with one embodiment. As an option, the framework 200 may be implemented in the context of any one or more of the embodiments set forth in any previous and/or subsequent figure(s) and/or description thereof. Of course, however, the framework 200 may be implemented in the context of any desired environment.

As shown, a plurality of cores 201 are provided. Each of the cores 201 has a plurality of threads 202 that have a plurality of allocated resources. Specifically, such resources include scalar resources 204, vector resources 206, load or store resources 208, and memory resources 210.

In one embodiment, the scalar resources 204 may include any resource whereby one set of data is processed at a time. For example, the scalar resources 204 may include single instruction single data (SISD) processing resources. Still yet, the vector resources 206 may include any resource that performs computations on more than one set of data simultaneously. For instance, the vector resources 206 may include single instruction multiple data (SIMD), pipeline, etc. processing resources.

In another embodiment, the load or store resources 208 may include any resource associated with loading or storing data. For example, the load or store resources 208 may include a bandwidth in connection with such data loading and/or storing. Further, the aforementioned memory resources 210 may refer to a capacity (e.g. size, speed, etc.) of memory.

As shown in FIG. 2, each of the resources may be allocated differently to each of the different threads 202. Further, while not necessarily illustrated, the allocation of resources among the threads 202 may differ among the different cores 201. Further, in some embodiments, the different cores 201 may further have differing resources and/or differing amounts thereof, thus further supporting the different allocation of resources to the threads 202 for the different cores 201.

Figure 3:
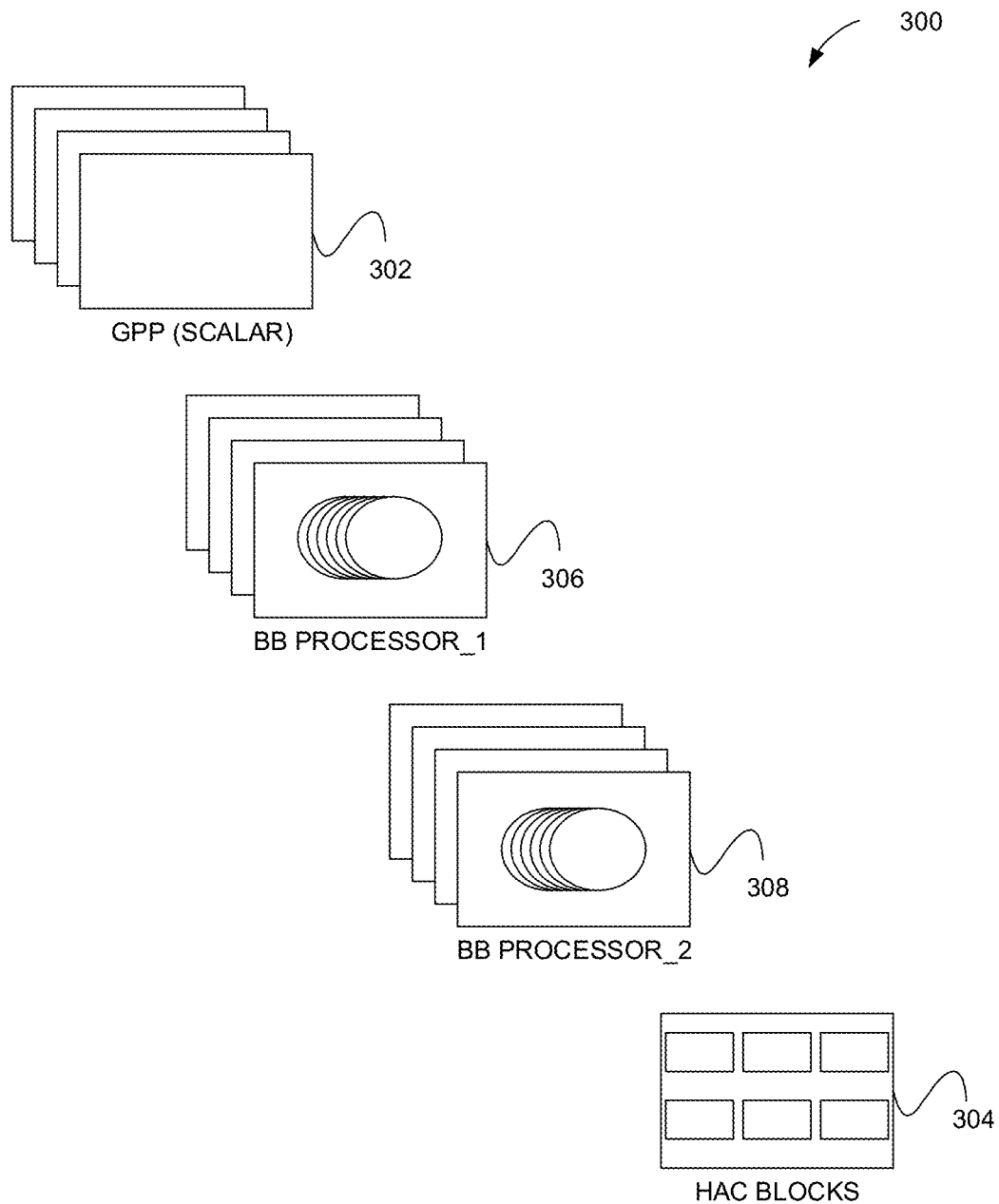
FIG. 3 illustrates a system containing multiple types of processors and hardware accelerators to perform a service, in accordance with one embodiment.

FIG. 3 illustrates a system 300 containing multiple types of processors and hardware accelerators to perform a service, in accordance with one embodiment. As an option, the system 300 may be implemented in the context of any one or more of the embodiments set forth in any previous and/or subsequent figure(s) and/or description thereof. Of course, however, the system 300 may be implemented in the context of any desired environment.

As illustrated, the system 300 includes a plurality of general purpose processor (GPP) blocks 302 and a plurality of hardware accelerator (HAC) blocks 304. On one hand, the GPP blocks 302 include a plurality of scalar resources that are very effectively re-purposed (flexible), but may exhibit low performance or low power efficiency. On the other hand, the HAC blocks 304 include specialized hardware that are not readily re-configurable, but rather perform specific functions in an accelerated manner. Still yet, further included is a plurality of first baseband processors 306 and a plurality of second baseband processor 308.

In various embodiments, the first baseband processor 306 and the second baseband processor 308 may have different types of resources or different amounts of resources (for at least one type of resource). Still yet, a degree of configurability (in terms of resource allocation capabilities) may or may not also vary among the baseband processors 306, 308. More information will now be set forth regarding one possible configuration of different baseband processors, in accordance with one embodiment.

Figure 4:
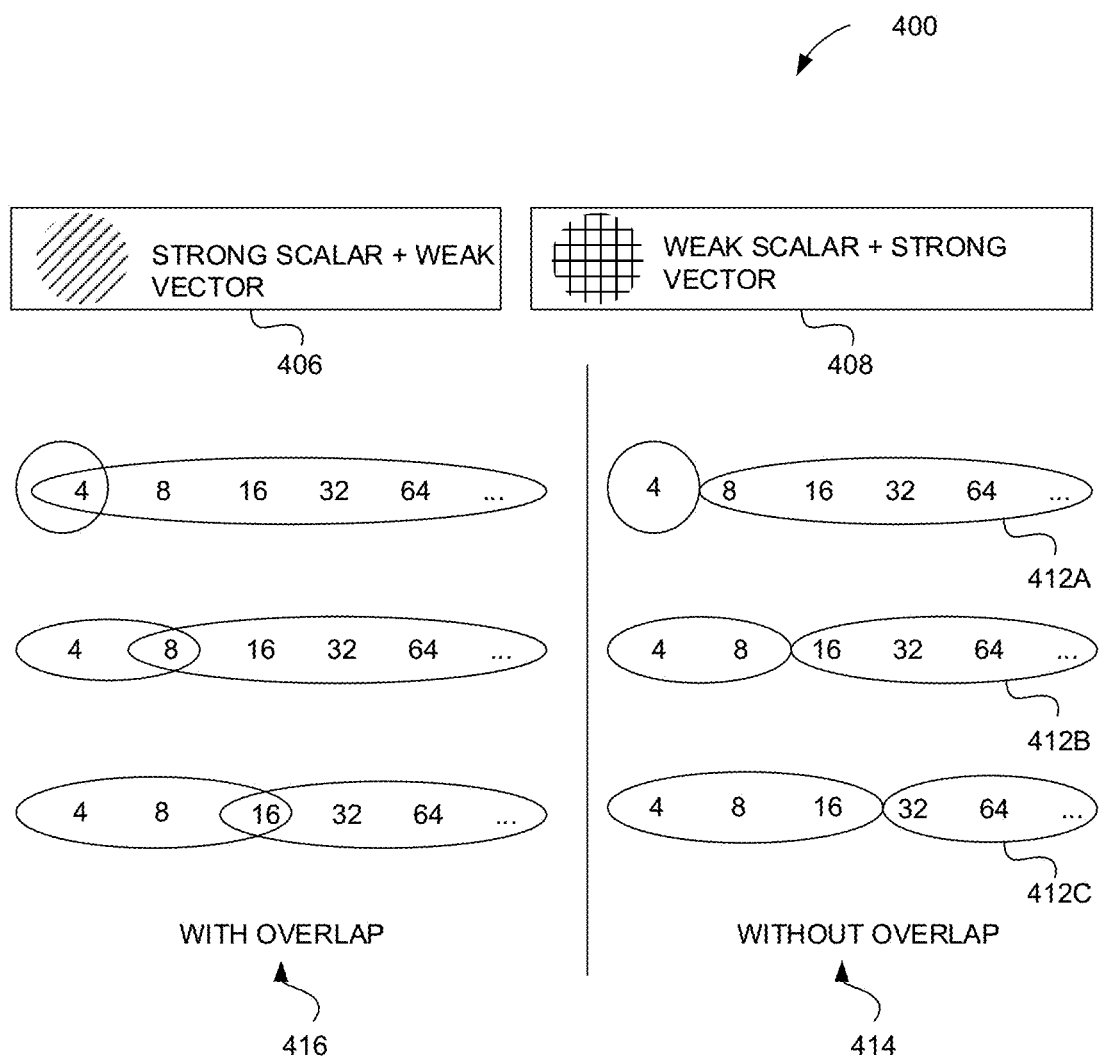
FIG. 4 illustrates a plurality of configurations for a first baseband processor and a second baseband processor, and overlapped configurations between the first and second baseband processors, in accordance with possible embodiments.

FIG. 4 illustrates a plurality of configurations 400 for a first baseband processor and a second baseband processor, and overlapped configurations between the first and second baseband processors, in accordance with possible embodiments. As an option, the configurations 400 may be implemented in the context of any one or more of the embodiments set forth in any previous and/or subsequent figure(s) and/or description thereof. For example, in one embodiment, the configurations 400 may be implemented in the context of the system 300 of FIG. 3. Of course, however, the configurations 400 may be implemented in the context of any desired environment.

As shown, included is a first baseband processor 406 and a second baseband processor 408. In the present embodiment, the baseband processors 406, 408 may differ in terms of vector resources (e.g. SIMD width, etc.) and scalar resources. Specifically, the first baseband processor 406 is equipped with a first amount of scalar resources and a second amount of vector resources. Further, the second baseband processor 408 is equipped with a third amount of scalar resources (that is less than the first amount) and a fourth amount of vector resources (that is greater than the second amount).

By this design, the resources of the respective baseband processor may be allocated to threads, as a function of resource availability. As shown in FIG. 4, a plurality of exemplary designs 412A, 412B, 412C are illustrated where the configurations of vector resources of the baseband processors 406, 408 vary to differing degrees. Further, different embodiments are also shown where the differing configurations of vector resources exhibit no overlap (414) as well as overlap (416) to a certain extent.

Figure 5:
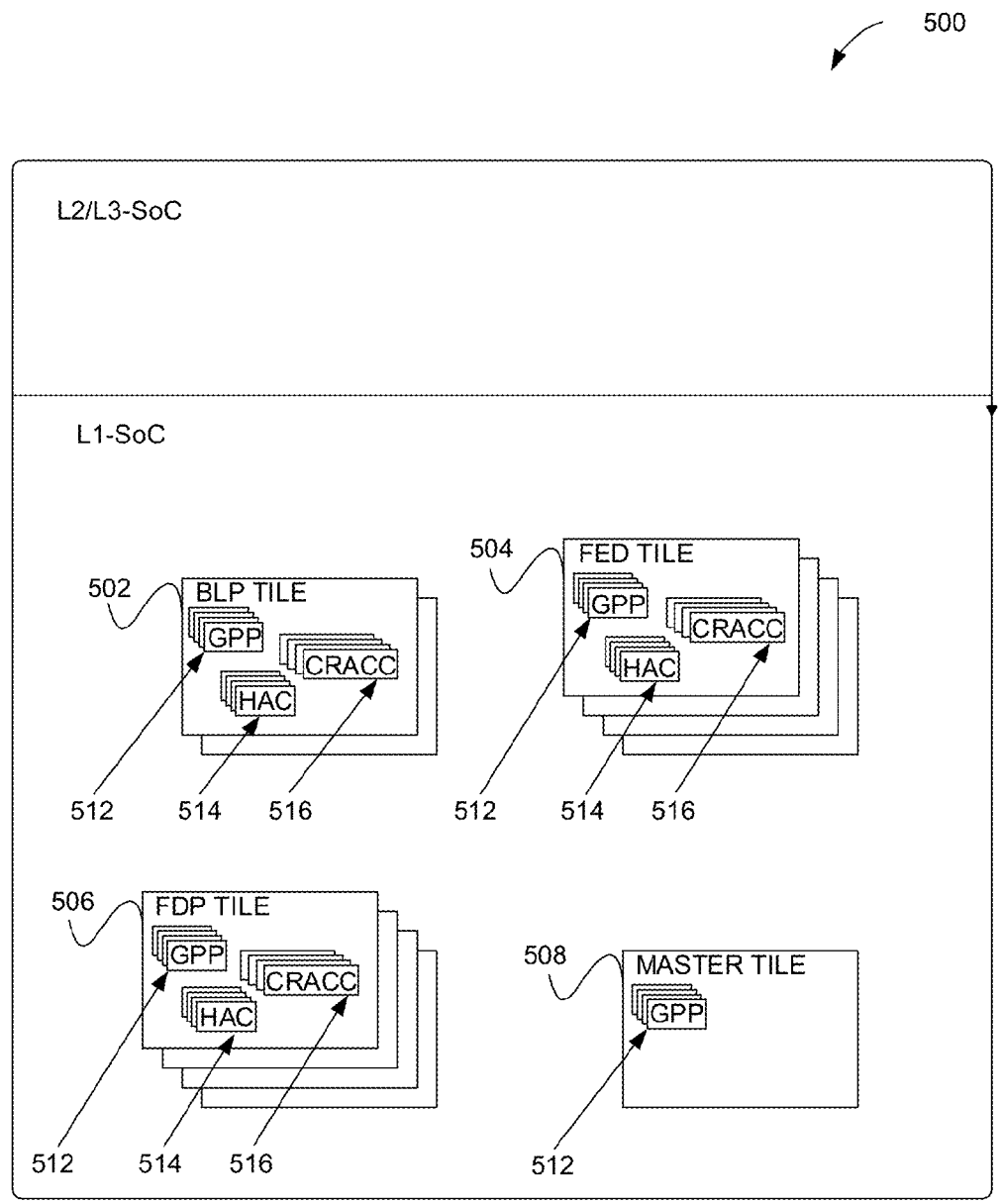
FIG. 5 illustrates different types of tiles in a baseband system-on-a-chip (SoC), in accordance with one embodiment.

FIG. 5 illustrates different types of tiles 500 in a baseband SoC, in accordance with one embodiment. As an option, the tiles 500 may be implemented in the context of any one or more of the embodiments set forth in any previous and/or subsequent figure(s) and/or description thereof. For example, in one embodiment, the tiles 500 may be implemented in the context of the systems 300/400 of FIGS. 3/4. Of course, however, the tiles 500 may be implemented in the context of any desired environment.

As illustrated in FIG. 5, included is a Layer 2/3 SoC and a Layer 1 SoC. The Layer 1 SoC has bit-level processing (BLP) tiles 502, front end processing (FEP) tiles 504, frequency domain processing (FDP) tiles 506, and a master tile 508. In use, the various tiles 502, 504, 506, and 508 are each purposed to carry out different specific services using its available resources, under the direction of the master tile 508.

The tiles 502, 504, 506, and 508 are shown to include diverse amounts of different types of resources. As illustrated, such resources include GPP blocks 512, HAC blocks 514, and configurable resource and configurable computing (CRACC) blocks 516. To this end, the CRACC blocks 516 may include baseband processors, and the tiles 502, 504, 506 may be implemented with such CRACC blocks 516. Layer 2/3 SoC may send service requests to Layer 1 SoC, so that Layer 1 SoC can perform the configuration of the resources (including the number of VLIW slots of threads, the load-store data path, the memory resources, the ratio of scalar function slots and vector function slots in a VLIW bundle, the vector width and the clock rate) in the tiles 502, 504, 506, and 508 by the CRACC blocks 516, based on the service requests from the Layer 2/3 SoC. Upon receiving the service requests, if the current CRACC configuration of the whole Layer 1 SoC is capable of supporting the service user with sufficient margin, the GPP blocks 512 in the master tile 508 allocates the service user to appropriate tiles and appropriate threads; otherwise, if the margin is too small, a reconfiguration is calculated. If the reconfiguration can produce sufficient margin for the service user, then the service request is granted and the reconfiguration is performed; otherwise, a rejection is send to the Layer 2/3 SoC.

Thus, different resource allocations may be utilized that balance a need for satisfying a service request and doing so in a manner that ensures that the underlying system is capable of operating under safe margin. Thus, whether resource reallocation is needed or not, the service request may be granted, while maintaining safe operation of the underlying system. Further, threads may be the subject of dynamic allocation of resources to accommodate different use cases. Just by way of example, one thread may be allocated significantly more processing power than another for high data rate, low transmission time interval (TTI), low latency, etc. operation.

In one embodiment, the aforementioned re-allocation of resources may require less than one thousand cycles, or even less (e.g. tens of cycles, etc.), in other embodiments. Further, the resources that remain unallocated may be powered down, for power saving purposes. Even still, the allocation may be static (e.g. completely static, semi-static, etc.), meaning the allocation may be at least partially dynamic.

As mentioned earlier, various embodiments described herein may be used in the context of cellular services and, in particular, 5G cellular services. Specifically, different from 3G and 4G cellular services, 5G requires a diverse air interface where many generations of air interfaces from the past (e.g. 3G, 4G, etc.) are clumped together as a package. Such diversity may be reflected in different waveforms, different bandwidths, different coding rates for different quality of connections, and diverse services such as different round trip time (RTT), different mobile speed, different data rates, etc. To accommodate this, some embodiments described herein may treat the capabilities of threads as a pool that can be re-allocated (e.g. re-partitioned, etc.) to these threads. In some embodiments, the frequency of any re-allocation may be determined as a function of the 5G standard. With such re-configurability being accomplished on the fly or semi-static, a digital signal processing (DSP) core is capable of providing diverse services in a power efficient manner (e.g. it can provide diverse services with a given power budget, etc.).

More information will now be set forth regarding various ways a system may be architected, in different embodiments, to allow allocation and re-allocation of resources via configuration/re-configuration. Specifically, FIGS. 6-14 illustrate various architectures capable of allocating resources, in accordance with various embodiments. As an option, the architectures may be implemented in the context of any one or more of the embodiments set forth in any previous and/or subsequent figure(s) and/or description thereof. For example, in one embodiment, the architectures may be implemented in the context of the systems 300/400/500 of FIGS. 3-5. Of course, however, the architectures may be implemented in the context of any desired environment. Further, the different architectures may also have different compilers and instruction set architectures (ISAs).

Figure 6:
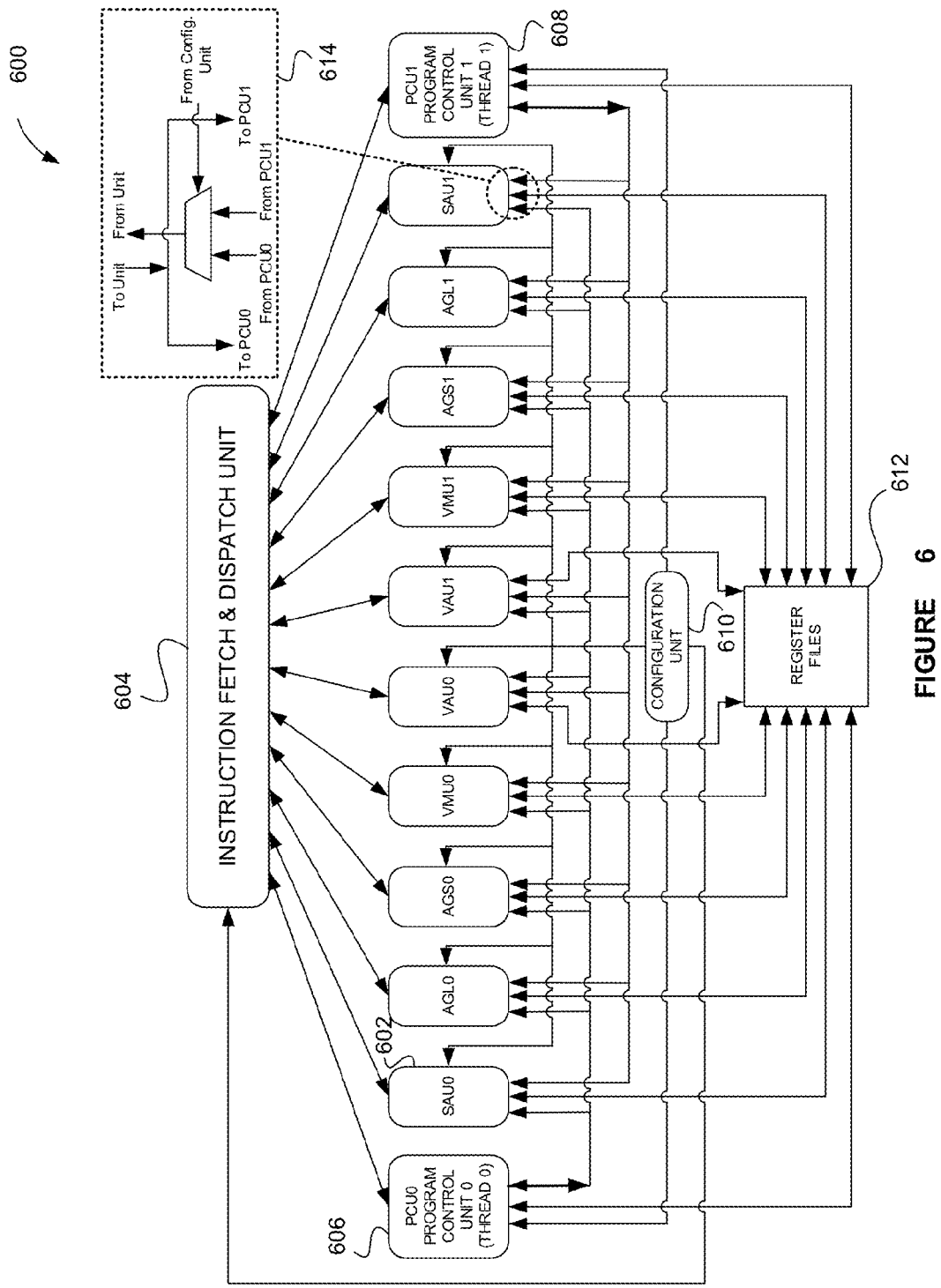
FIG. 6 illustrates a first architecture capable of allocating resources among threads, in accordance with one embodiment.

FIG. 6 illustrates a first architecture 600 capable of allocating resources among threads, in accordance with one embodiment. As shown, the architecture 600 includes a plurality of functional units 602 (e.g. scalar units, vector units, etc.) and register files 612. Further included is an instruction fetch/dispatch unit 604 for fetching and dispatching instructions for all the threads. The architecture 600 also includes a first program control unit 606 and a second program control unit 608 which control the program execution of their corresponding threads, respectively. A configuration unit 610 controls allocation of resources to the threads via control circuitry 614 associated with each of the functional units 602.

Figure 7:
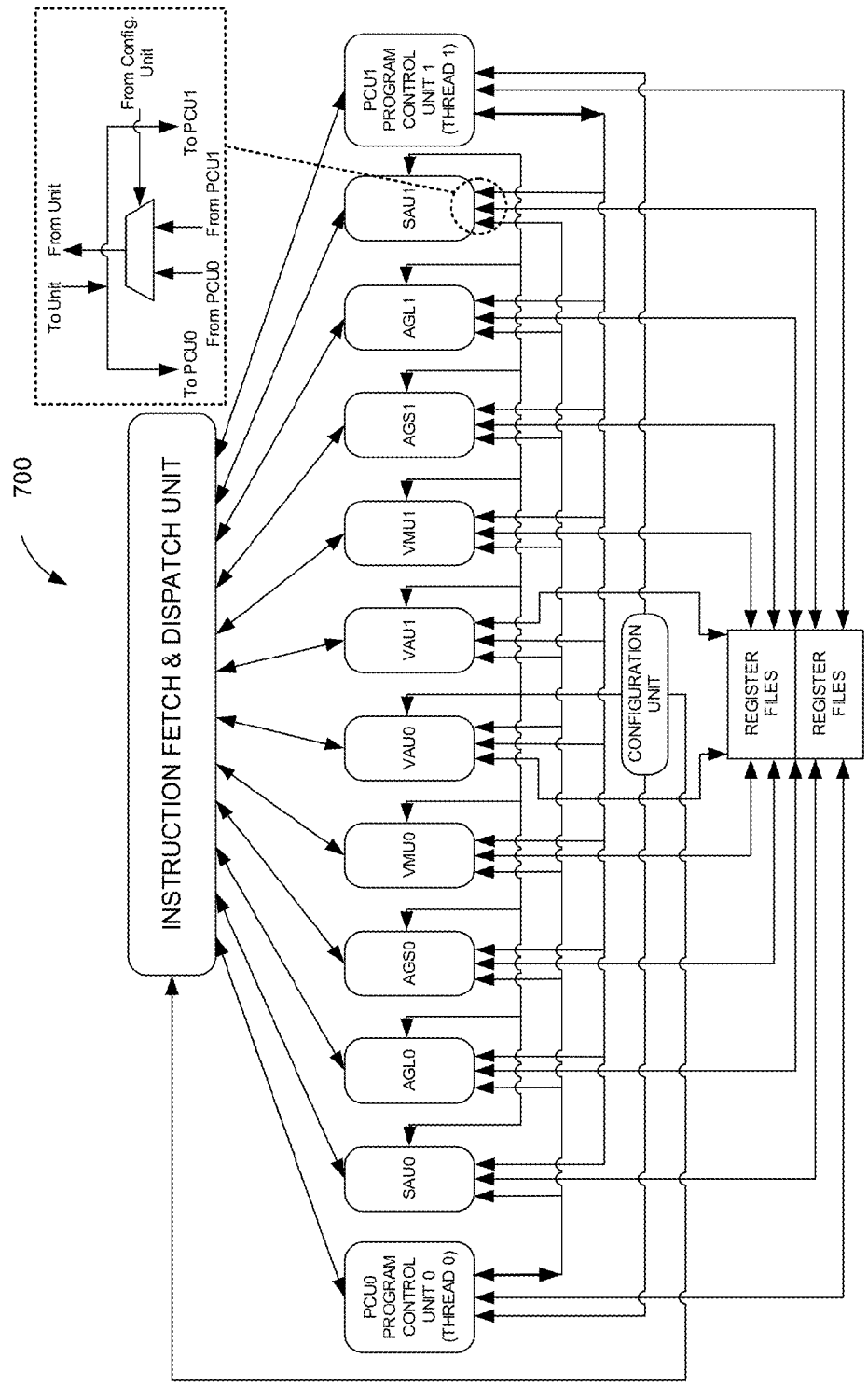
FIG. 7 illustrates a symmetric partition on functional units among the threads, respectively, in accordance with another embodiment.
Figure 8:
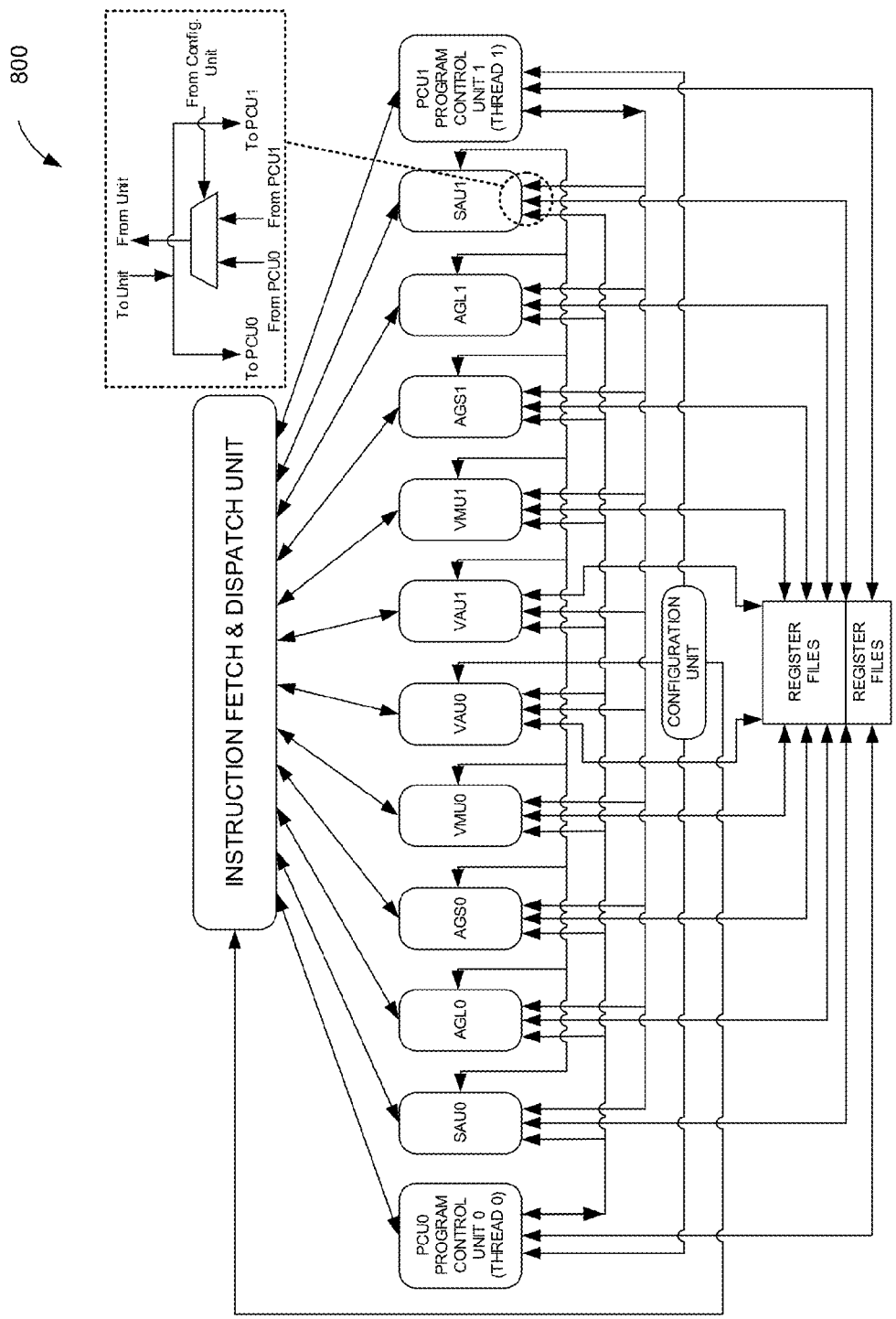
FIG. 8 illustrates an asymmetric partition on functional units among two threads, respectively, in accordance with another embodiment.
Figure 9:
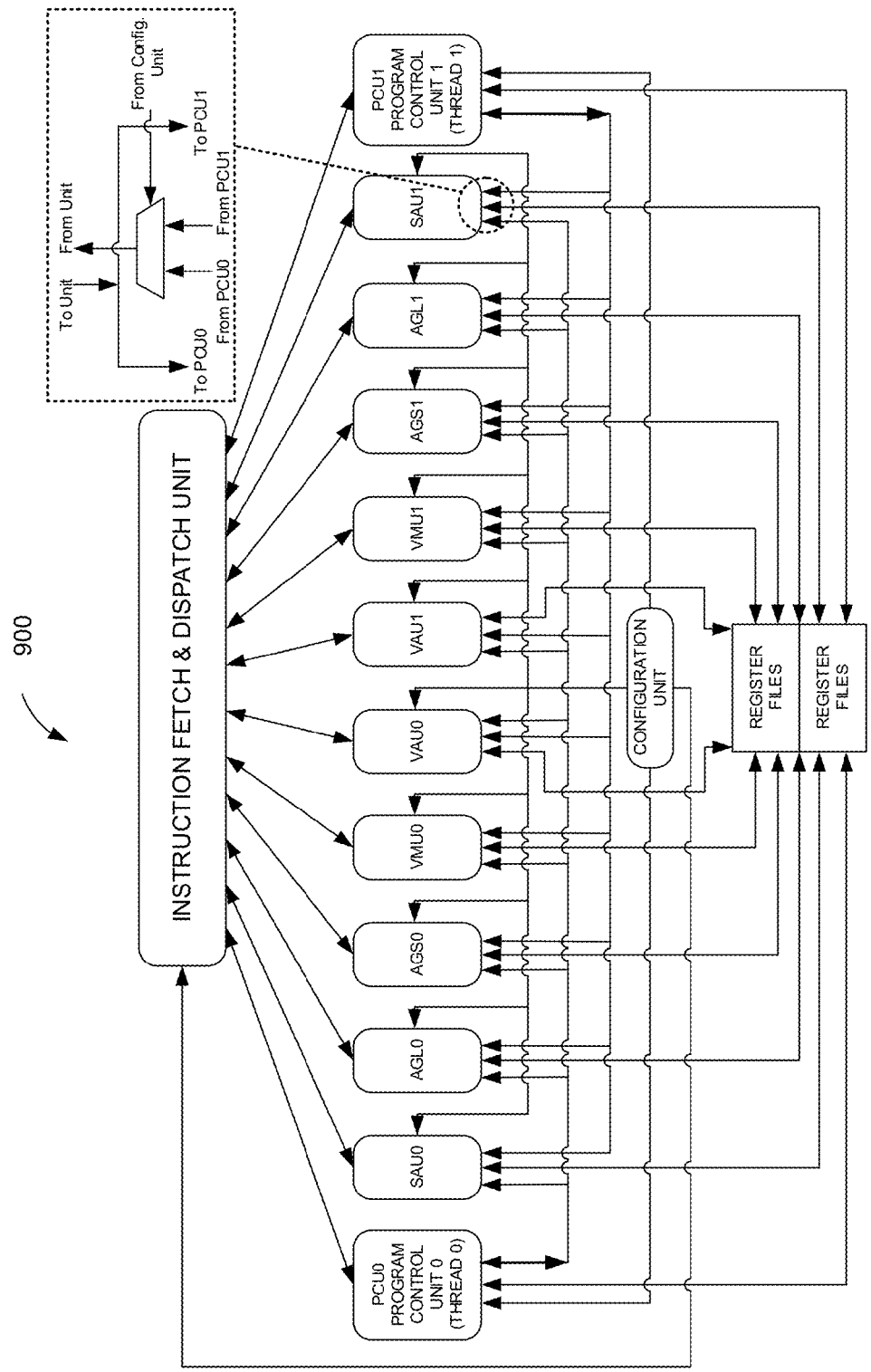
FIG. 9 illustrates a design where each thread is allocated some functional units and two threads may also share some resources, in accordance with another embodiment.

FIGS. 7-9 illustrate different variations of the first architecture 600 of FIG. 6. For example, FIG. 7 illustrates a design 700 with a symmetric partition on functional units among the two threads. For example, SAU0, AGL0, AGS0, VMU0 and VAU0 are allocated to Thread 0; and SAU1, AGL1, AGS1, VMU1 and VAU1 are allocated to Thread 1. FIG. 8 illustrates a design 800 with an asymmetric partition on functional units among the two threads. For example, SAU0, AGL0, AGS0, VMU0, VAU0, VAU1 and VMU1 are allocated to Thread 0; and SAU1, AGL1 and AGS1 are allocated to Thread 1. FIG. 9 illustrates a design 900 where each thread is allocated some functional units and two threads may also share some functional units. For example, SAU0, AGL0, AGS0 are allocated to Thread 0; AGS1, AGL1 and SAU1 are allocated to Thread 1; and VMU0, VAU0, VAU1, VMU1 are shared by Thread 0 and Thread 1.

Figure 10:
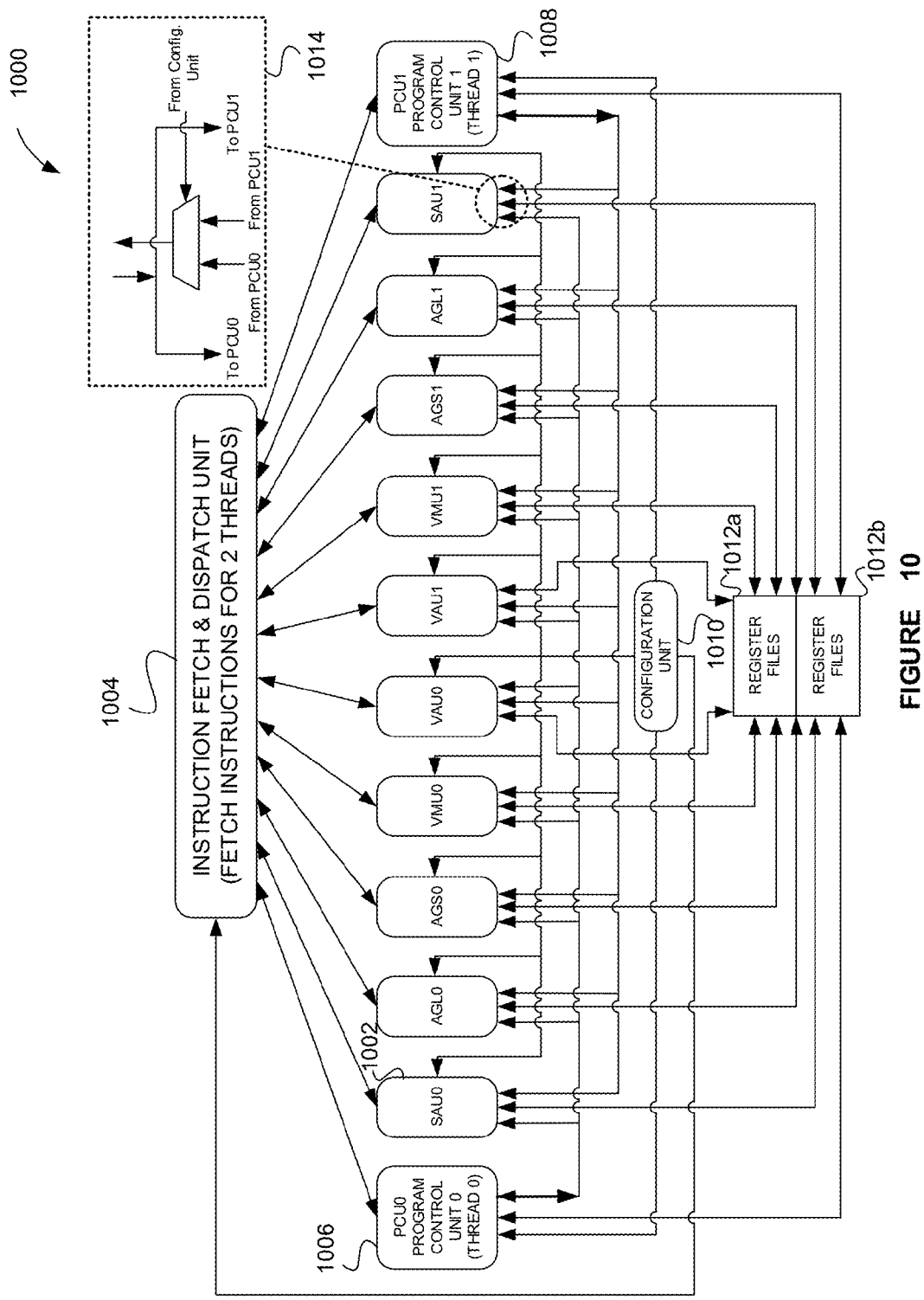
FIG. 10 illustrates a second architecture capable of allocating functional units among threads, in accordance with a fixed allocation embodiment.

FIG. 10 illustrates a second architecture 1000 capable of allocating functional units among threads, in accordance with a fixed allocation embodiment. As shown, the architecture 1000 includes a plurality of functional units 1002 and register files 1012a, 1012b. Further included is an instruction fetch/dispatch unit 1004 for fetching and dispatching instructions for all the threads. The architecture 1000 also includes a first program control unit 1006 and a second program control unit 1008 which control the program execution of their corresponding threads, respectively. A configuration unit 1010 controls allocation of resources to the threads via control circuitry 1014 associated with each of the functional units 1002.

In the present fixed allocation embodiment, some of the functional units 1002 are permanently allocated to one of the threads. Specifically, AGL0 and AGS0 are allocated to a first thread, while AGL1 and AGS1 are allocated to a second thread. The remaining functional units 1002, however, may be dynamically allocated to either thread, during use.

Figure 11:
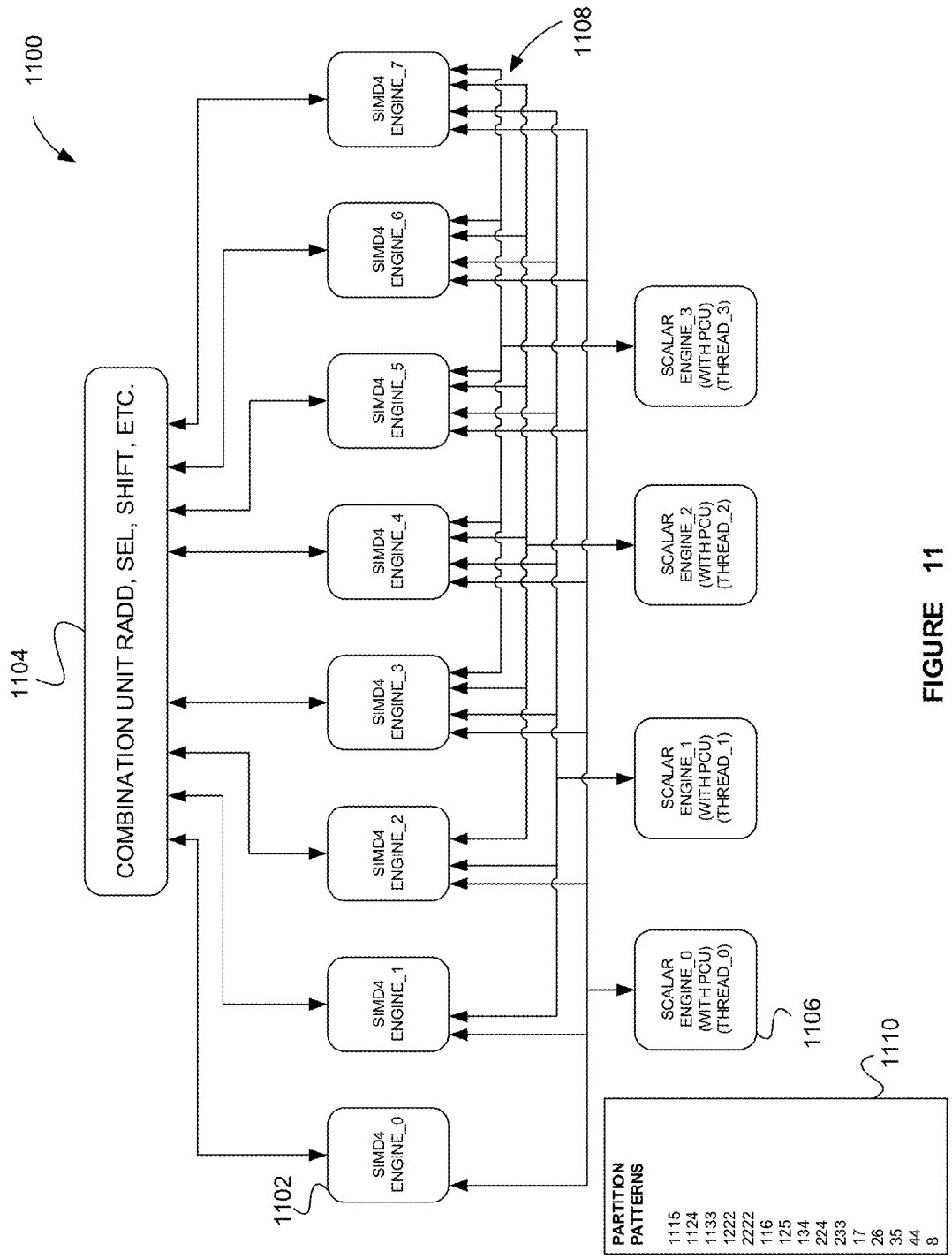
FIG. 11 illustrates a third architecture capable of allocating vector single instruction multiple data (SIMD) engines among threads, in accordance with a reconfigurable SIMD embodiment.
Figure 12:
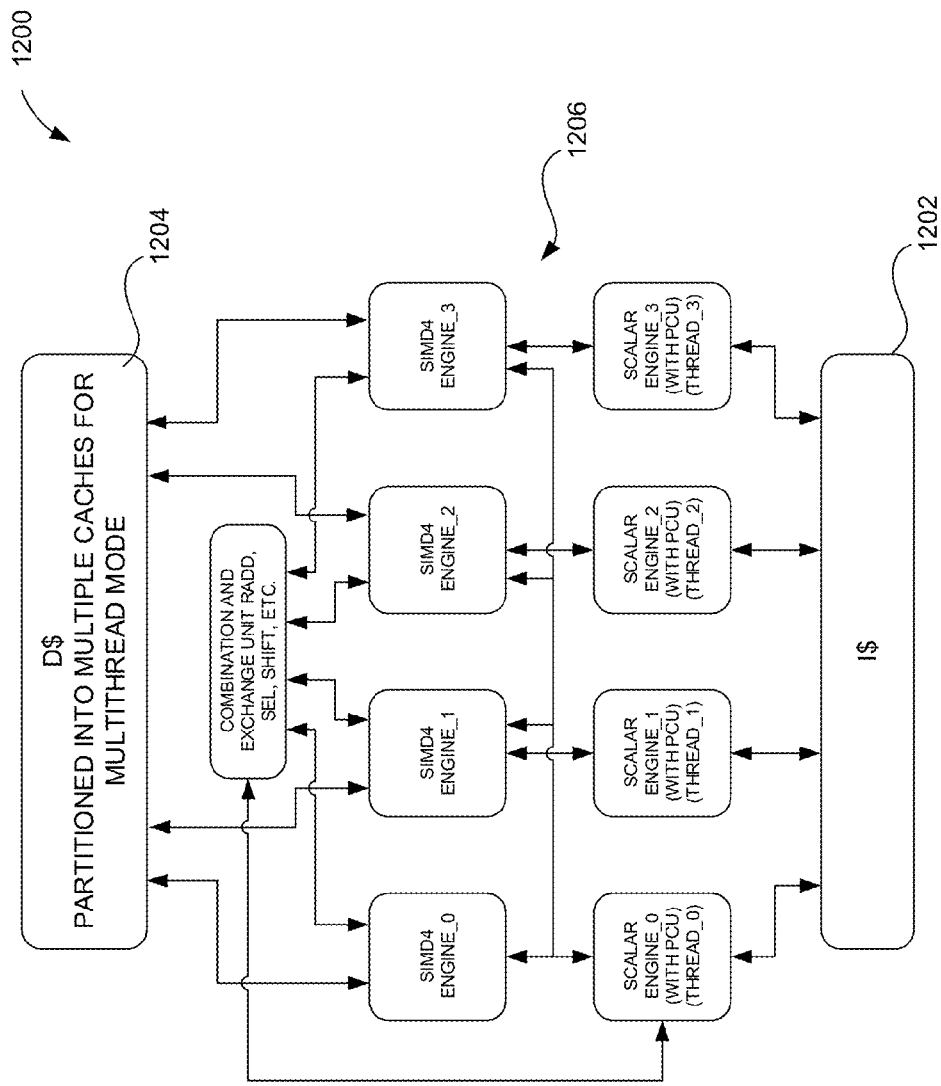
FIG. 12 illustrates how an instruction cache and data cache may be connected to a configurable resource and configurable computing (CRACC) core, in accordance with one embodiment.

FIG. 11 illustrates a third architecture 1100 capable of allocating vector SIMD engines among threads, in accordance with a reconfigurable SIMD embodiment. As shown, the architecture 1100 includes a plurality of vector SIMD engines 1102 connected to a combination unit 1104. The vector SIMD engines 1102 are also connected to a plurality of scalar engines 1106 via a plurality of configurable interconnects 1108. In use, the vector SIMD engines 1102 may be partitioned and allocated to a plurality of threads, and non-allocated scalar engines 1106 may be power-gated. A plurality of exemplary partition patterns 1110 which may be employed during use are also shown. FIG. 12 illustrates a design 1200 similar to the third architecture 1100 of FIG. 11, where the design 1200 provides a framework by which an instruction cache 1202 and a data cache 1204 may be connected to a CRACC core 1206.

Figure 13:
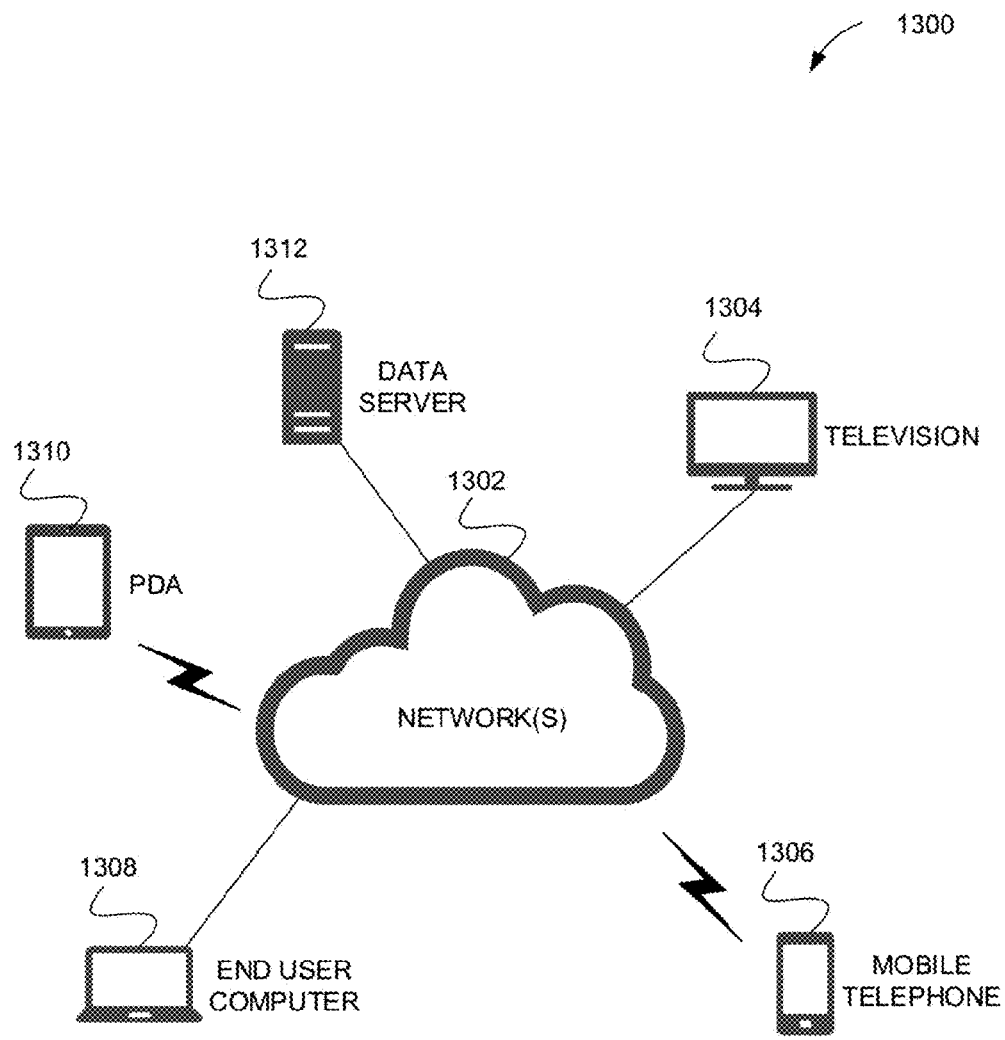
FIG. 13 illustrates a network architecture, in accordance with one possible embodiment.

FIG. 13 illustrates a network architecture 1300, in accordance with one possible embodiment. As shown, at least one network 1302 is provided. In the context of the present network architecture 1300, the network 1302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1302 may be provided.

Coupled to the network 1302 is a plurality of devices. For example, a server computer 1312 and an end user computer 1308 may be coupled to the network 1302 for communication purposes. Such end user computer 1308 may include a desktop computer, lap-top computer, and/or any other type of logic. Still yet, various other devices may be coupled to the network 1302 including a personal digital assistant (PDA) device 1310, a mobile phone device 1306, a television 1304, etc.

Figure 14:
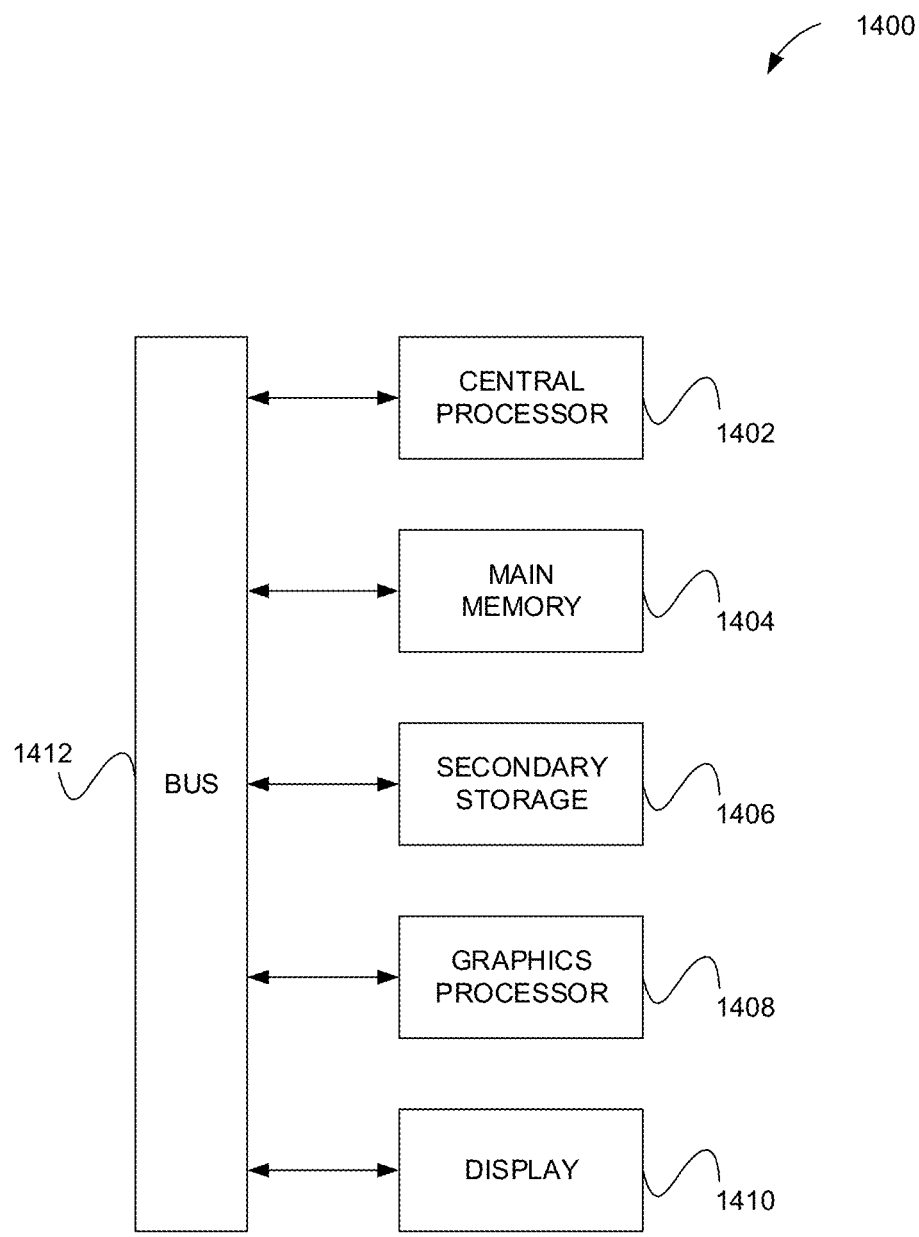
FIG. 14 illustrates an exemplary system, in accordance with one embodiment.

FIG. 14 illustrates an exemplary system 1400, in accordance with one embodiment. As an option, the system 1400 may be implemented in the context of any of the devices of the network architecture 1300 of FIG. 13. Of course, the system 1400 may be implemented in any desired environment.

As shown, a system 1400 is provided including at least one central processor 1402 which is connected to a communication bus 1412. The system 1400 also includes main memory 1404 [e.g. random access memory (RAM), etc.]. The system 1400 also includes a graphics processor 1408 and a display 1410.

The system 1400 may also include a secondary storage 1406. The secondary storage 1406 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1404, the secondary storage 1406, and/or any other memory, for that matter. Such computer programs, when executed, enable the system 1400 to perform various functions (as set forth above, for example). Memory 1404, storage 1406 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An apparatus, comprising:
a plurality of baseband processors comprising a first baseband processor and a second baseband processor, wherein the first baseband processor includes a higher ratio of scalar functional units to vector functional units than the second baseband processor;
wherein each baseband processor of the plurality of baseband processors comprises:
a receiving unit to receive a request for a wireless communication service;
a configuration unit to allocate at least one of a plurality of resources to a plurality of threads, wherein the plurality of resources includes at least the scalar functional units and the vector functional units and the at least one of the plurality of resources is configurable; and
a performing unit to perform the wireless communication service with the threads, utilizing the allocated at least one of the plurality of resources,
wherein the plurality of baseband processors is associated with a Layer 1 system-on-a-chip, the request for the wireless communication service is received from a Layer 2/3 system-on-a-chip, and a master processor of the Layer 1 system-on-a-chip that directs operation of the plurality of baseband processors and is configured for:
determining whether the request for the wireless communication service is capable of being completed within a predetermined margin,
performing the allocation among the plurality of baseband processors associated with the Layer 1 system-on-a-chip, if it is determined that the request for the wireless communication service is capable of being completed within the predetermined margin, and
performing a reconfiguration of the plurality of baseband processors of the Layer 1 system-on-a-chip, if it is determined that the request for the wireless communication service is not capable of being completed within the predetermined margin.

2. The apparatus of claim 1, wherein a number of the plurality of threads is configurable.

3. The apparatus of claim 1, wherein the plurality of threads includes very long instruction word (VLIW) processor instruction issuing slots, wherein a number of VLIW processor instruction issuing slots is configurable.

4. The apparatus of claim 1, wherein the plurality of resources includes at least one of load or store functional units, memory or cache resources and vector units with configurable width.

5. The apparatus of claim 4, wherein the configuration unit to allocate at least one of the plurality of resources to the plurality of threads comprises grouping the plurality of resources in at least one of scalar functional units, vector functional units, load or store functional units, memory or cache resources and vector units with configurable width.

6. The apparatus of claim 1, wherein unallocated resources of the plurality of resources are configured for being powered down.

7. The apparatus of claim 1, wherein the configuration unit allocates at least one of the plurality of resources to the plurality of threads based on at least one of a power efficiency and processing capacity.

8. A method, comprising:
receiving, by an apparatus including a first baseband processor and a second baseband processor, a request for a wireless communication service, wherein the first baseband processor includes a higher ratio of scalar functional units to vector functional units than the second baseband processor;
allocating, by the apparatus, at least one of a plurality of resources to a plurality of threads, wherein the plurality of resources includes at least the scalar functional units and the vector functional units, at least one of the plurality of resources is configurable; and
performing the wireless communication service in connection with the threads, utilizing the allocated at least one of the plurality of resources,
wherein the first baseband processor and the second baseband processor are associated with a Layer 1 system-on-a-chip, the request for the wireless communication service is received from a Layer 2/3 system-on-a-chip, and a master processor of the Layer 1 system-on-a-chip that directs operation of the first baseband processor and the second baseband processor and is configured for:
determining whether the request for the wireless communication service is capable of being completed within a predetermined margin,
performing the allocation among the first baseband processor and the second baseband processor associated with the Layer 1 system-on-a-chip, if it is determined that the request for the wireless communication service is capable of being completed within the predetermined margin, and
performing a reconfiguration of the first baseband processor and the second baseband processor of the Layer 1 system-on-a-chip, if it is determined that the request for the wireless communication service is not capable of being completed within the predetermined margin.

9. The method of claim 8, wherein a number of the plurality of threads is configurable.

10. The method of claim 8, wherein the plurality of threads includes very long instruction word (VLIW) processor instruction issuing slots, wherein a number of VLIW processor instruction issuing slots is configurable.

11. The method of claim 8, wherein the plurality of resources includes at least one of load or store functional units, memory or cache resources and vector units with configurable width.

12. The method of claim 11, wherein the allocating the at least one of the plurality of resources to the plurality of threads comprises grouping the plurality of resources in at least one of scalar functional units, vector functional units, load or store functional units, memory or cache resources, and vector units with configurable width.

13. The method of claim 8, wherein the allocating the at least one of the plurality of resources to the plurality of threads is based on at least one of a power efficiency and processing capacity.

14. The apparatus of claim 1, wherein a configuration of vector resources of the first baseband processor and the second baseband processor overlap.

15. The apparatus of claim 1, wherein the master processor of the Layer 1 system-on-a-chip is further configured for:
determining whether the request for the wireless communication service is capable of being completed within the predetermined margin with the reconfiguration,
performing the allocation among the plurality of baseband processors associated with the Layer 1 system-on-a-chip, if it is determined that the request for the wireless communication service is capable of being completed within the predetermined margin with the reconfiguration, and
sending the Layer 2/3 system-on-a-chip a rejection, if it is determined that the request for the wireless communication service is not capable of being completed within the predetermined margin with the reconfiguration.

16. The apparatus of claim 1, wherein a frequency of the allocation is based on a cellular protocol.

17. The apparatus of claim 1, wherein the allocation accommodates use of different cellular protocols by different users.

* * * * *